US012601326B2

(12) United States Patent
Zeyher

(10) Patent No.: US 12,601,326 B2
(45) Date of Patent: Apr. 14, 2026

(54) TORQUE DRIVEN DYNAMIC GENERATOR WITH INERTIA SUSTAINING DRIVE

(71) Applicant: Craig H. Zeyher, Haddonfield, NJ (US)

(72) Inventor: Craig H. Zeyher, Haddonfield, NJ (US)

( * ) Notice: Subject to any disclaimer, the term of this patent is extended or adjusted under 35 U.S.C. 154(b) by 0 days.

(21) Appl. No.: 18/621,044

(22) Filed: Mar. 28, 2024

(65) Prior Publication Data

US 2024/0376869 A1     Nov. 14, 2024

Related U.S. Application Data

(60) Provisional application No. 63/559,623, filed on Feb. 29, 2024, provisional application No. 63/630,587, filed on Feb. 14, 2024, provisional application No. 63/629,647, filed on Nov. 14, 2023, provisional application No. 63/629,457, filed on Oct. 26, 2023, provisional application No. 63/629,133, filed on Sep. 22, 2023, provisional application No. 63/628,641, filed on Aug. 7, 2023, provisional application No. 63/628,123, filed on Jun. 24, 2023, provisional application No. 63/577,983, filed on Jun. 12, 2023, provisional application No. 63/577,970, filed on Jun. 8, 2023, provisional application No. 63/577,652, filed on May 9, 2023.

(51) Int. Cl.
*F03G 3/08* (2006.01)
*H02K 7/02* (2006.01)

(52) U.S. Cl.
CPC ............. *F03G 3/083* (2021.08); *H02K 7/025* (2013.01)

(58) Field of Classification Search
CPC .. F03G 3/08; F03G 3/083; H02K 7/02; H02K 7/025
See application file for complete search history.

(56) References Cited

U.S. PATENT DOCUMENTS

| | | | |
|---|---|---|---|
| 3,726,146 A | 4/1973 | Mishler | |
| 4,150,580 A | 4/1979 | Silkebakken | |
| | (Continued) | | |

FOREIGN PATENT DOCUMENTS

| | | | |
|---|---|---|---|
| CN | 113839514 A | * | 12/2021 |
| CN | 118801726 A | * | 10/2024 |
| | (Continued) | | |

*Primary Examiner* — Adam D Rogers
(74) *Attorney, Agent, or Firm* — LaMorte & Associates, P.C.

(57) ABSTRACT

A torque driven dynamic generator system with an inertia sustaining drive that uses gyroscopic and precessional forces from rotating flywheel assemblies to generate torque. The torque is reflected back upon the processing assemblies to help sustain flywheel rotation, inertia, and momentum. Simultaneously, torque is exerted upon a ball bearing race, that is mounted between the two flywheel assemblies. The ball bearing race is caused to rotate, and the resulting driving force is exerted through and upon each opposite flywheel assembly causing forced precession that increases the momentum and torque. Torque converters are provided above and below the flywheel assemblies that utilize springs or magnetic opposing fields to reflecting torque back upon the processing assemblies. This helps sustain flywheel rotation, inertia, and momentum.

18 Claims, 8 Drawing Sheets

(56) References Cited

U.S. PATENT DOCUMENTS

| | | | |
|---|---|---|---|
| 5,150,625 A | 9/1992 | Mishler | |
| 5,313,850 A | 5/1994 | Finvold et al. | |
| 7,181,987 B2 * | 2/2007 | Hamady | A63B 21/22 |
| | | | 74/5.7 |
| 7,375,436 B1 | 5/2008 | Goldin | |
| 11,121,613 B2 | 9/2021 | Zeyher | |
| 11,221,633 B2 * | 1/2022 | Ala | B64C 19/00 |
| 2004/0134190 A1 | 7/2004 | Kanki | |
| 2007/0240529 A1 * | 10/2007 | Zeyher | F03G 3/083 |
| | | | 74/5.44 |
| 2008/0048455 A1 | 2/2008 | Carney | |
| 2008/0148880 A1 | 6/2008 | Hamady | |
| 2009/0019958 A1 * | 1/2009 | Zeyher | H02K 53/00 |
| | | | 74/5.7 |
| 2010/0132489 A1 | 6/2010 | Harrison | |
| 2010/0236849 A1 | 9/2010 | Wishart | |
| 2011/0041628 A1 | 2/2011 | Ozturk | |
| 2012/0262016 A1 | 10/2012 | Wang | |
| 2018/0034356 A1 | 2/2018 | Urch | |
| 2019/0326795 A1 | 10/2019 | Zeyher | |
| 2024/0376869 A1 | 11/2024 | Zeyher | |

FOREIGN PATENT DOCUMENTS

| | | | | | |
|---|---|---|---|---|---|
| KR | 20130029491 A | * | 3/2013 | | |
| WO | WO-02061372 A1 | * | 8/2002 | ....... | A63B 21/00069 |
| WO | WO 2014/104938 A1 | | 7/2014 | | |

* cited by examiner

TORQUE DRIVEN DYNAMIC GENERATOR WITH INERTIA SUSTAINING DRIVE

RELATED APPLICATIONS

This Application claims the benefit of the following provisional applications:

U.S. Provisional Application No. 63/559,623, filed Feb. 29, 2024;

U.S. Provisional Application No. 63/638,587 filed Feb. 14, 2024;

U.S. Provisional Application No. 63/629,647, filed Nov. 14, 2023;

U.S. Provisional Application No. 63/629,133 filed Sep. 22, 2023;

U.S. Provisional Application No. 63/628,641, filed Aug. 7, 2023;

U.S. Provisional Application No. 63/628,123, filed Jun. 24, 2023;

U.S. Provisional Application No. 63/577,983, filed Jun. 12, 2023;

U.S. Provisional Application No. 63/577,970, filed Jun. 8, 2023;

U.S. Provisional Application No. 63/577,652, filed May 9, 2023;

U.S. Provisional Application No. 63/576,874, filed Mar. 13, 2023;

U.S. Provisional Application No. 63/576,800, filed Mar. 6, 2023.

BACKGROUND OF THE INVENTION

1. Field of the Invention

In general, the present invention relates to the structure of flywheel assemblies that are used to store rotational energy. More particularly, the present invention relates to systems that utilize precession and inertia in driving and sustaining the generation of electric power.

2. Prior Art Description

In order to drive forward motion, any mass that rotates along a circular path and utilizes a single axle without modification must allow only one end of the axle to engage in frictional drive within a circular track at any one time. An alternative is a modification of the axle to permit counter rotation of one end of the axle in relation to the other end. Such counter rotation can be accomplished through use of a gearing arrangement, use of a split axle, or a two axle design to engage in circular revolving rotation through friction or through the interplay of magnetic fields. The following disclosure assumes the use of a split axle.

Assuming the mass is a flywheel rotating and revolving along a circular path, when you offset the axis of rotation of a spinning object you get two things. First, a gyroscopic force acts to restore itself to its original axis of rotation. Second, the system experiences precession. These forces can be used to produce a torque that is capable of interacting through a common medium in helping sustain rotation. Such uses of precessional forces are exemplified by U.S. Pat. No. 7,375,436 to Goldin.

A problem associated with such prior art systems is that the flywheel is set into a rotational orbit to generate precessional forces. The rotational orbit of the flywheel prevents the system from using multiple flywheels in a space efficient manner. Furthermore, the use of a rotational orbit prevents any redirection of the precessional forces for beneficial use. As such, a need exists for an improved system that can store energy using more than one flywheel and can utilize precessional forces from the flywheels in a way that is highly space/energy efficient. This need is met by the present invention as described and claimed below.

SUMMARY OF THE INVENTION

The present invention is a torque driven dynamic generator system with an inertia sustaining drive. The system uses gyroscopic and precessional forces from rotating flywheel assemblies to generate torque. The torque is reflected back upon the processing assemblies to help sustain flywheel rotation, inertia, and momentum. Simultaneously, torque is exerted upon a common medium, such as a ball bearing race, that is mounted midway between the two flywheel assemblies. The flywheel assemblies apply torque from opposite sides to the ball bearing race. The ball bearing race is caused to rotate, and the resulting driving force is exerted through and upon each opposite flywheel assembly.

This driving force results in the phenomena known as forced precession that causes a significant increase in rotational speed and torque within each of the individual flywheel assemblies. This helps sustain and prolong system rotation. Initially each flywheel assembly is capable of rotation and revolution when subject to externally powered motor drive resulting in each flywheel establishing its own original axis of rotation. Upon obtaining significant speed, as much as several hundred or thousand revolutions per minute by use of the externally powered motor drive, the flywheel's axis of rotation are offset from their original axis of rotation through use of telescoping arms, servos, or the like. This produces gyroscopic forces and precession as each flywheel assembly seeks to restore itself to its original axis of rotation. However, the rotating and revolving flywheel assemblies are inhibited from returning to their original axis of rotation. This produces torque that is channeled and combined through use of a common element to mutually assist in driving forward motion. Torque converters are provided above and below the flywheel assemblies that utilize springs or magnetic opposing fields to reflecting torque back upon the processing assemblies. This helps sustain flywheel rotation, inertia, and momentum.

At this point, the direct current motor drive can be converted electronically or mechanically to use as generator and transitioned back and forth as needed if necessary. The original external driving force DC motor can now be used as a DC generator for generating electric power.

Additional force or control can be achieved through compression of springs, magnetic opposing fields, or other compression responsive assemblies making up the torque converters. Other means of adding additional inertia, torque and force can be achieved through modulation of the offsetting apparatus, i.e., telescoping arms, variations in rotating mass as in its design/distribution allowing for greater or lesser inertia in balancing or surpassing resistance.

Two torque converters are utilized in sustaining generator rotation along with two inertia flywheel elements. One torque converter is located above and one below the flywheel assemblies. For purposes of clarity, reference to the either torque converting assembly should be understood to apply equally to the other.

The present invention is a system and method for storing rotational energy. The system uses one or more flywheel assemblies that each contain a flywheel, a flywheel axle, and contact wheels. The flywheel axle has opposed ends and a long axis. The flywheel is coupled to the flywheel axle at a point between the opposed ends. The contact wheels connect to the opposed ends of the flywheel axle. The contact wheels cause the flywheel axle and the flywheel to spin as the contact wheels turn.

Two flywheel assemblies are disposed within a containment housing. The containment housing defines an internal chamber for holding the flywheel assemblies. Within the containment chamber, the contact wheels of the flywheel assemblies contact the walls. The flywheel assemblies are rotated within the containment housing about a common centerline of rotation. The rotation causes the contact wheels to roll along the interior of the containment housing. The rolling of the contact wheels causes the flywheel axle and the flywheel to spin.

Once the flywheel is at an operational speed, control arms are used to tilt the flywheel axles within the containment housing. The flywheels assemblies are inhibited from returning to their original axis of rotation. This produces torque that is channeled and combined through use of a common bearing race ring to mutually assist in driving forward motion. Torque converters are provided above and below the flywheel assemblies that utilize springs or magnetic opposing fields to reflecting torque back upon the processing assemblies. The result is a spinning assembly that can retain rotational energy for long periods of time at high torque.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE DRAWINGS

Although the present invention system and methodology can be embodied in many ways, only one exemplary embodiment of the system is illustrated. The exemplary embodiment is being shown for the purposes of explanation and description. The exemplary embodiment is selected in order to set forth one of the best modes contemplated for the invention. The illustrated embodiment, however, is merely exemplary and should not be considered as limitations when interpreting the scope of the appended claims.

Figure 1:
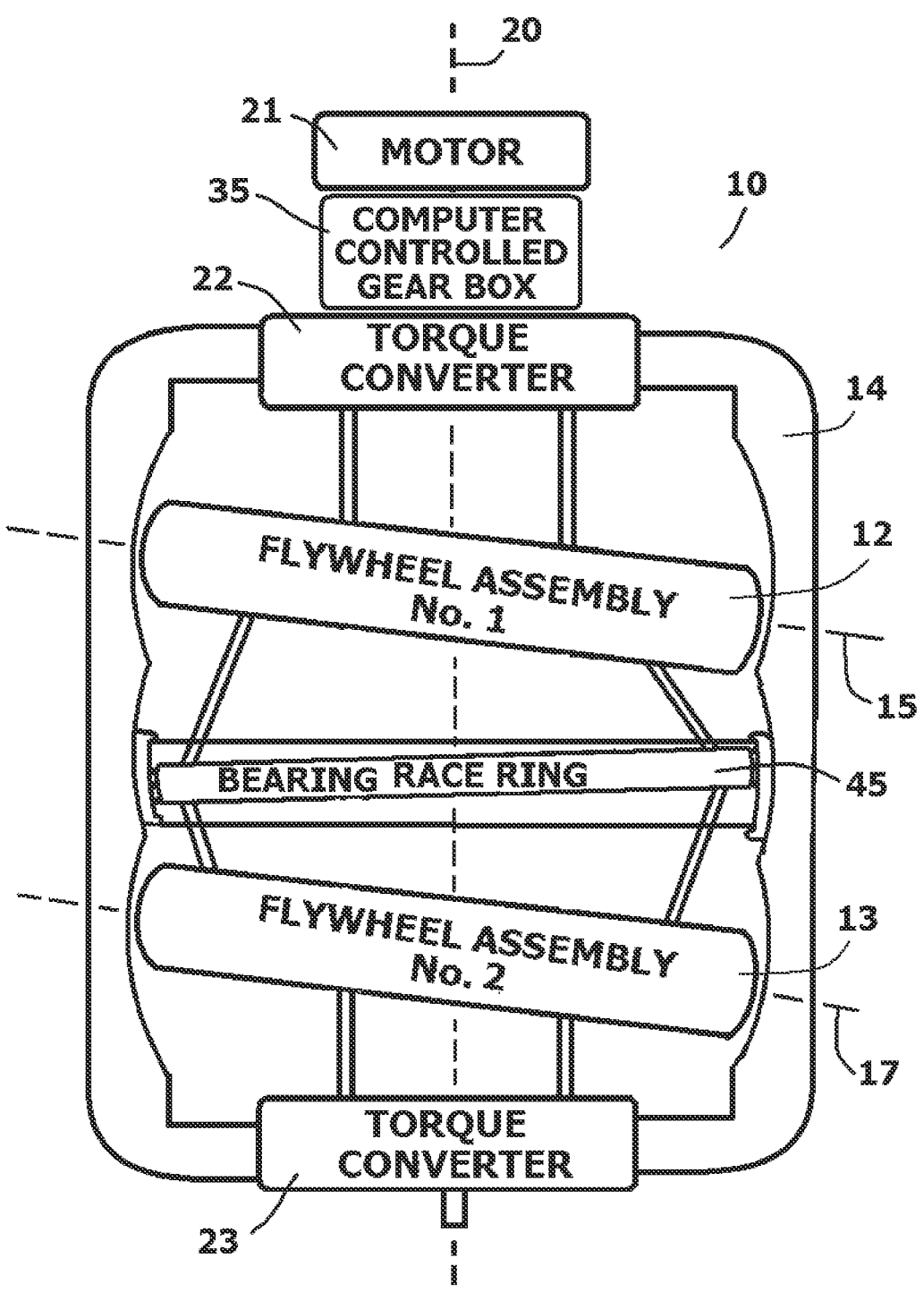
FIG. 1 is a block diagram schematic outlining the major components of an exemplary embodiment of the present invention system.

Referring to FIG. 1, a broad overview of the present invention system 10 is shown. The system 10 includes a set of two flywheel assemblies 12, 13. More than one set of flywheel assemblies can be used, but the shown embodiment that utilizes two flywheel assemblies 12, 13 is preferred. Each of the flywheel assemblies 12, 13 has an axis line 15, 17 around which a flywheel spins. The two axis lines 15, 17 of the two flywheel assemblies 12, 13 are parallel and remain parallel during the operation of the system 10. Furthermore, the flywheel assemblies 12, 13 are vertically aligned about a common centerline of rotation 20. The flywheel assemblies 12 rotate about the centerline of rotation 20 inside a containment housing 14.

Figure 2:
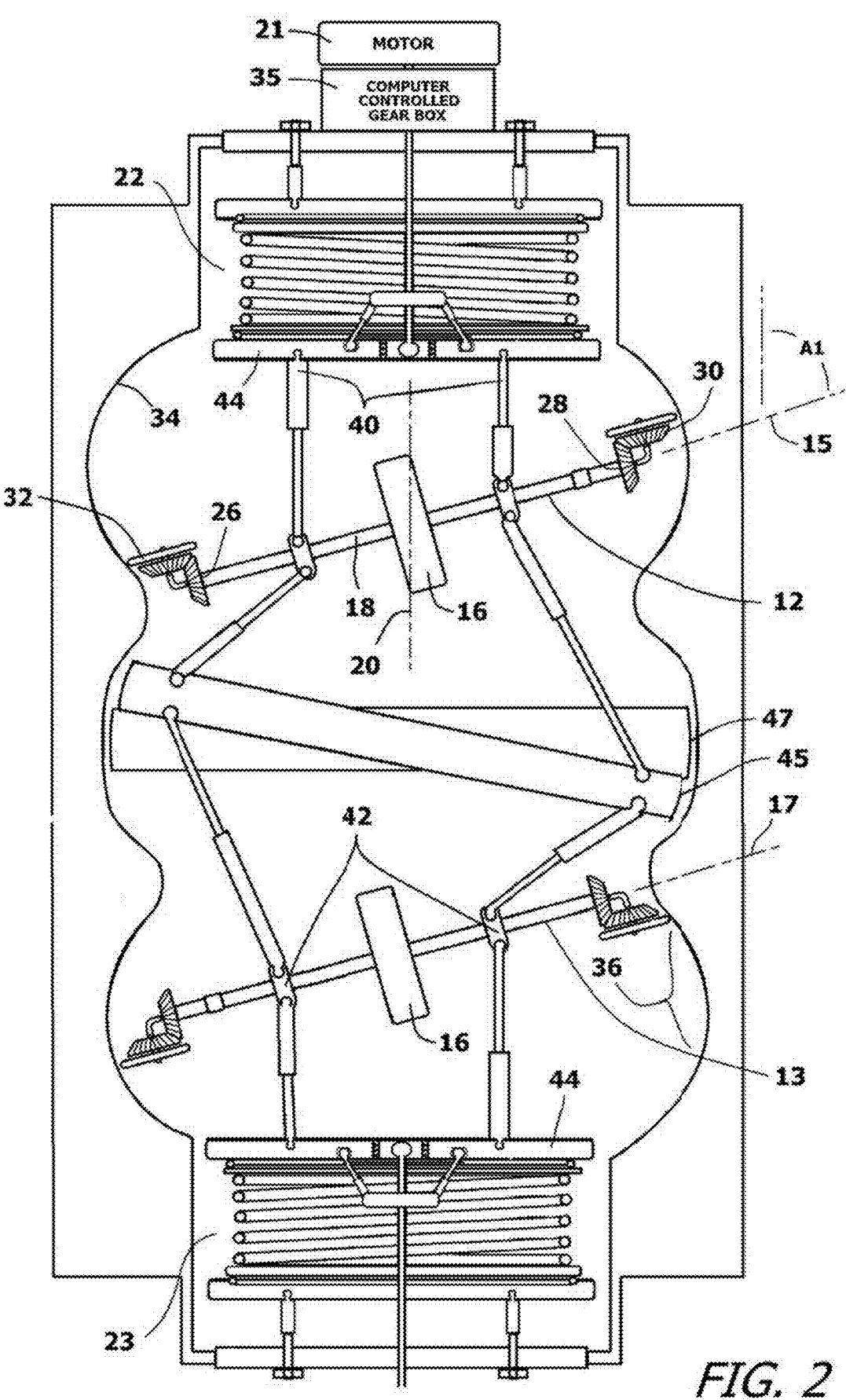
FIG. 2 is a detailed cross-section of the exemplary system.

Referring to FIG. 1 in conjunction with FIG. 2, it will be understood that each flywheel assembly 12, 13 includes a flywheel 16. The flywheels 16 spin on flywheel axles 18. The two shown flywheel axles 18 are concentric with the axis lines 15, 17. Accordingly, the flywheel axles 18 are parallel. Furthermore, the flywheel axles 18 are initially set at an angle of inclination A1 relative to the centerline of rotation 20. Both of the flywheel assemblies 12, 13 are simultaneously rotated about the centerline of rotation 20 within the containment housing 14 using the power provided by a DC motor 21.

As the flywheel assemblies 12, 13 rotate around the centerline of rotation 20, the rotational energy is mechanically transferred to the various flywheels 16. This causes the flywheels 16 to spin. Once the flywheels 16 are at an operational speed, the angles of inclination A1 associated with the axles 18 of the flywheels 16 are changed and are preferably changed to be perpendicular to the centerline of rotation 20. The movement of the flywheel assemblies 12, 13 from an inclined orientation to a horizontal orientation creates gyroscopic forces that act to return the flywheel assemblies 12, 13 back to their original orientations. However, the flywheels assemblies are inhibited from returning to their original axis of rotation. In addition to the flywheels 16 spinning, the entirety of flywheel assemblies 12, 13 are rotating in the housing 14. The change in orientation therefore generates precessional forces.

A bearing race ring 45 is provided in between the flywheel assemblies 12, 13. As will be later explained in more detail, the forces generated by the flywheel assemblies 12, 13 are channeled and combined through use of the bearing race ring 45 to mutually assist in driving forward motion. Torque converters 22, 23 are provided above and below the flywheel assemblies 12, 13 that utilize springs or magnetic opposing fields in reflecting torque back upon the processing assemblies. The resulting energy can then be used to rotate the DC motor 21, therein converting the DC motor 21 into a generator. The conversion of rotational energy from the DC motor 21 as a motor to the DC motor as a generator is controlled by a computer controlled gear box 35 and/or by electronic controls. The motor 21 provides rotational energy until the flywheel assemblies 12, 13 reach an optimal speed. The motor 21 is then unpowered, wherein the DC motor 21 becomes a DC generator. The motor 21 receives rotational energy from the flywheel assemblies 12, 13 for as long as the flywheel assemblies 12, 13 are spinning in an operational range.

Figure 3:
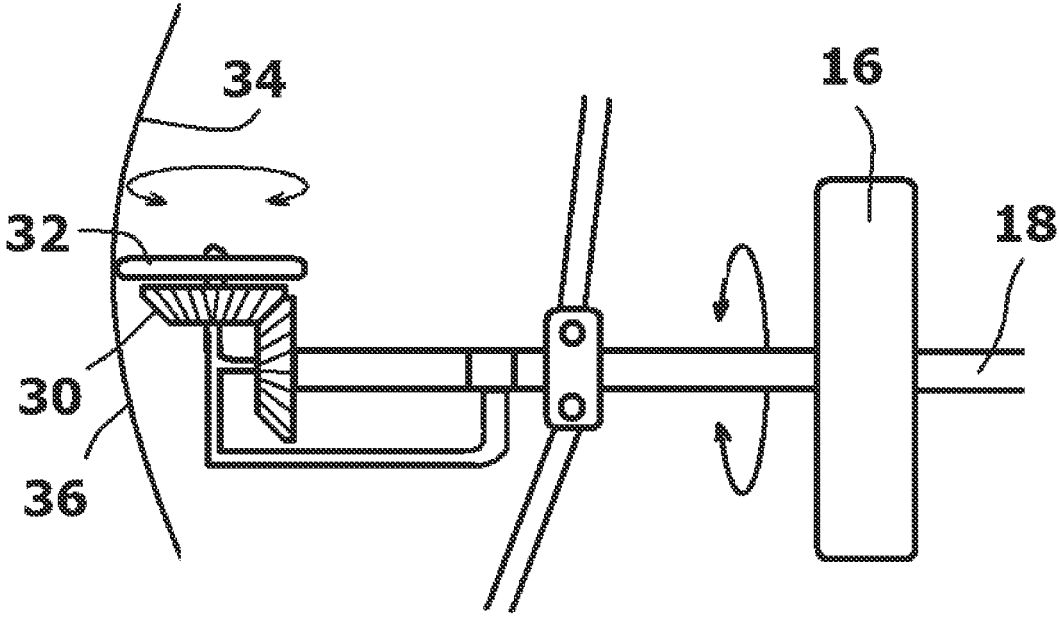
FIG. 3 is an enlarged view of a termination at the end of a flywheel assembly used in the exemplary embodiment of FIG. 2.

Referring to FIG. 2 in conjunction with FIG. 3, it can be seen that each flywheel 16 is affixed to a flywheel axle 18. The flywheel axle 18 has a first end 26 and an opposing second end 28. The first end 26 and the second end 28 of the flywheel axle 18 terminate with bevel gear assemblies 30. A contact wheel 32 powers each bevel gear assembly 30. That is, when the contact wheel 32 rotates, the rotational energy turns the bevel gear assembly 30. The bevel gear assembly 30 transfers the rotational energy to the flywheel axle 18 and the flywheel axle 18 transfers the rotational energy to the flywheel 16.

Each contact wheel 32 contacts an interior surface 34 of the containment housing 14. The angle of inclination A1 for the flywheel axle 18 can vary between a first inclining angle and a second declining angle. The length of the flywheel axle 18 with its bevel gear assemblies 30 and contact wheels 32 is constant. The contact wheels 32 contact with the interior surfaces 34 regardless of the angle of inclination A1 of the flywheel axle 18. In this manner, the contact wheel 32 can maintain contact with the concave track 36 as it rotates within the containment housing 14 through the full range of inclination angles.

Figure 4:
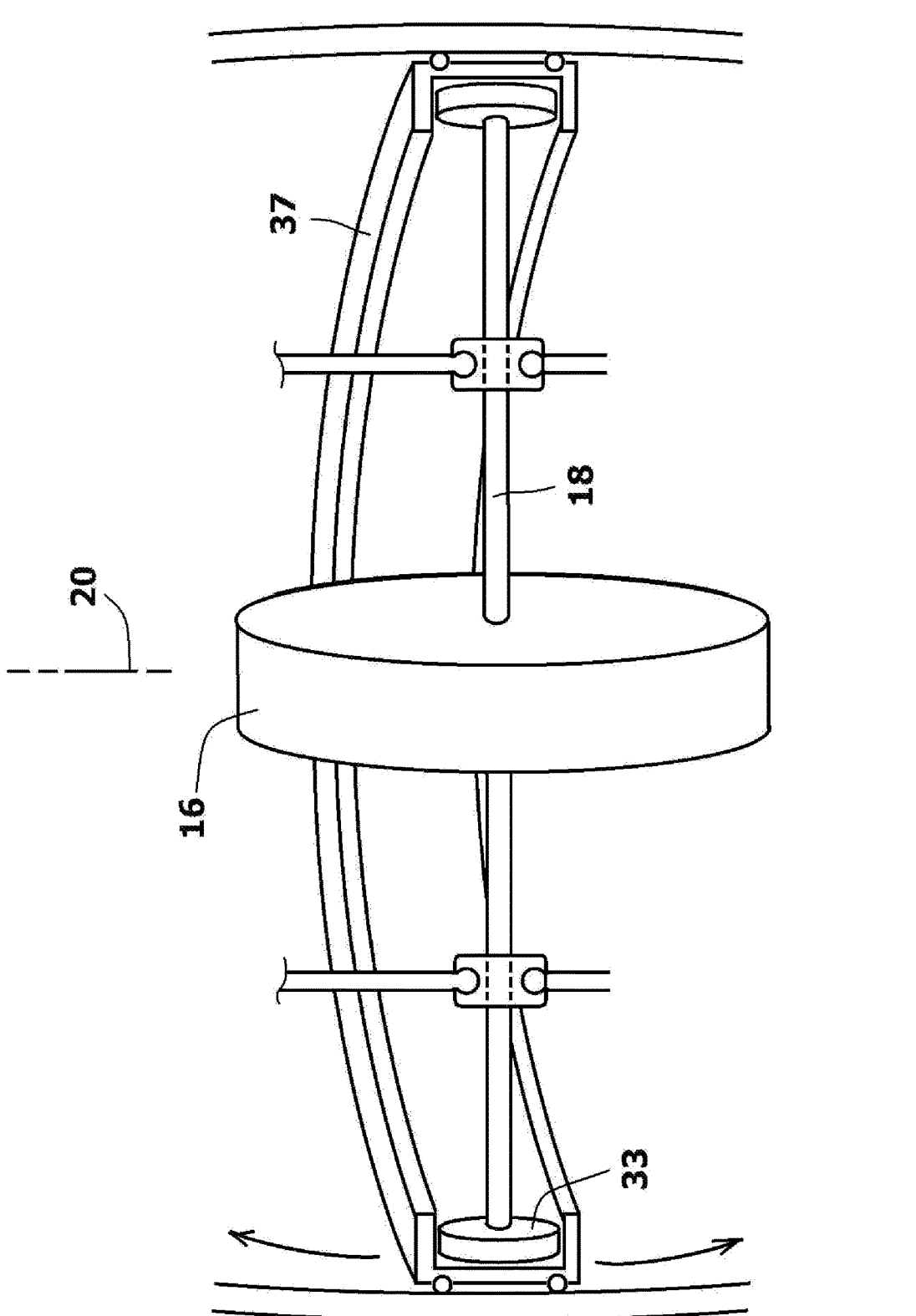
FIG. 4 is an enlarged view of for an alternate termination at the end of a flywheel assembly that can be substituted for the prior termination shown in FIG. 3.

Referring to FIG. 4, an alternate configuration is shown for spinning the flywheel 16. In this embodiment, the flywheel 16 is set on an axle 18 in the center of the axle 18. The two ends of the axle are terminated with contact wheels 33. In this manner, when the contact wheels 33 roll, the axle 18 spins and the flywheel 16 spins. The contact wheels 33 are set into a gimble track 37. The gimble track 37 can wobble to different angles of inclination relative to the centerline of rotation 20, as indicated by the arrows. In this manner, the contact wheels 33 remain in contact with the gimble track 37 and roll inside the gimble track 37 as the axle 18 rotate and the gimble track 37 undulates within the containment housing 14 through the full range of inclination angles.

Returning to the primary embodiment of FIG. 2, it will be understood that for each flywheel assembly 12, 13, the power needed to rotate the flywheel axles 18 around the centerline of rotation 20 is provided by a first set of control arms 40. The control arms 40 engage each flywheel axle 18 at symmetric positions on either side of the flywheel 16. The control arms 40 engage the flywheel axles 18 with slide bearings 42 or jointed couplers that leave the flywheel axle 18 free to rotate relative to the control arms 40. The control arms 40 extend between the flywheel axle 18 and to drive platforms 44 on one of the specialized torque converters 22, 23. The drive platforms 44 rotate, as is later described. The rotation of the drive platforms 44 causes the control arms 40 to rotate about the centerline of rotation 20. The rotation of the control arms 40 causes the flywheel axles 18 to rotate about the centerline of rotation 20. The rotation of the flywheel axles 18 causes the contact wheels 32 to roll and the flywheels 16 to spin while rotating.

The central bearing race ring 45 is disposed midway between the first flywheel assembly 12 and the second flywheel assembly 13. The bearing race ring 45 is a generally flat ring that is gimbled to a supporting casing 47. The bearing race ring 45 is free to pivot in the supporting casing 47. The result is a spinning bearing race ring 45 that can wobble through a range of inclinations while spinning.

The first flywheel assembly 12 and the second flywheel assembly 13 are attached to opposite surfaces of the bearing race ring 45 using the control arms 40. Rotational forces are transferred to the bearing race ring 45 through the control arms 40. Accordingly, any inclination in one of the flywheel assemblies 12, 13 is passed into the bearing race ring 45 and is transferred to the other flywheel assembly 12, 13. Accordingly, all forces that act to change the orientation of the flywheel assemblies 12, 13 are shared.

The control arms 40 that extend between the flywheel assemblies 12, 13 and the bearing race ring 45 can be adjusted in length to fine tune the orientations of the flywheel assemblies 12, 13 as they spin in the containment housing 14.

Figure 5:
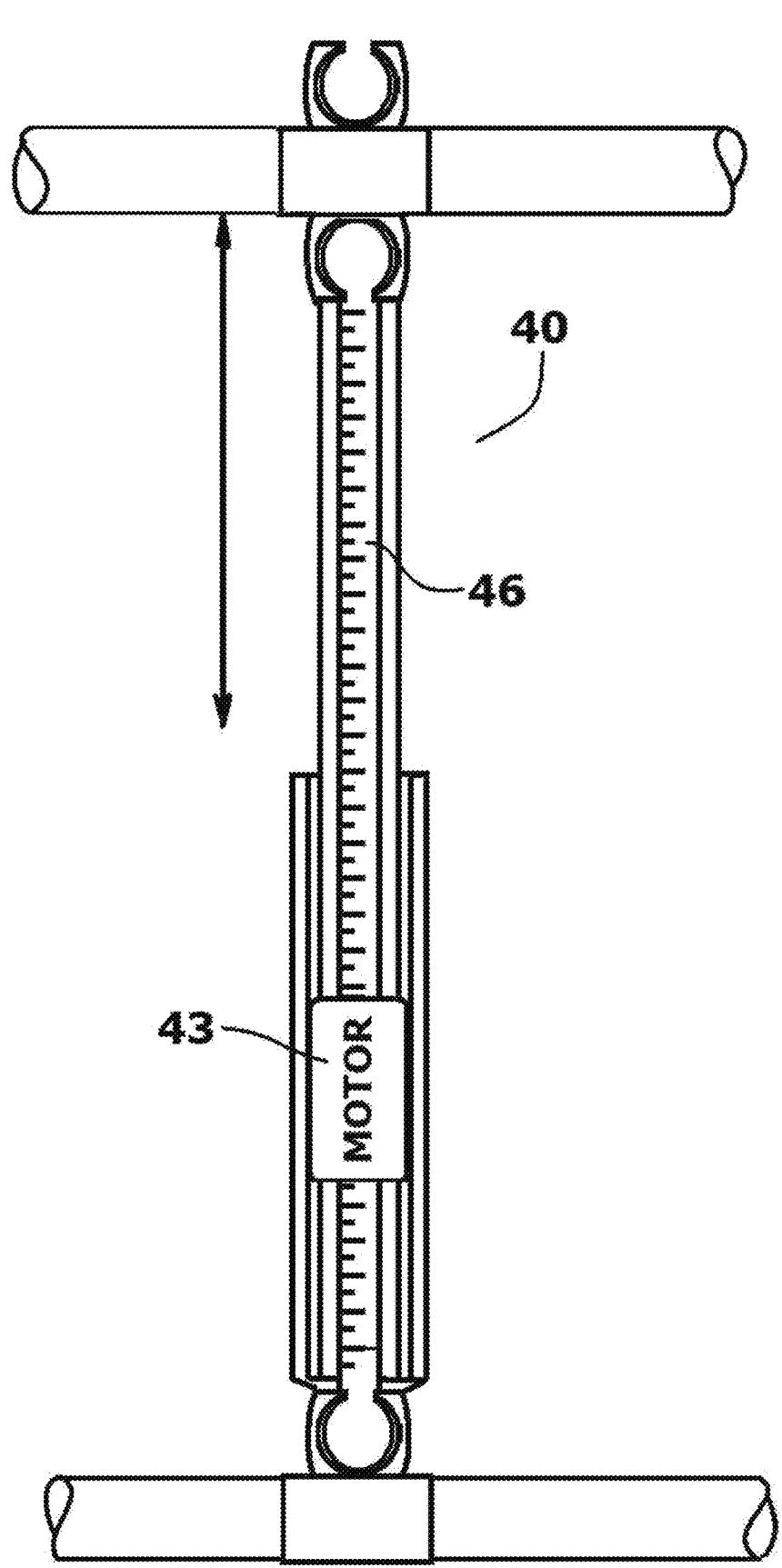
FIG. 5 is an enlarged cross-section of a control arm used in the exemplary embodiment of FIG. 2.

Referring to FIG. 5 in conjunction with FIG. 2, it will be understood that at least some of the control arms 40 are selectively adjustable in length. At least some of the control arms 40 contain motors 43 that selectively extend and retract an internal element 46 that can elongate and shorten the length of the control arm 40. The mass of the control arms 40 remains constant regardless of length. As such, changing the length of the control arms 40 has no effect on spin balance. Since the control arms 40 are attached to each flywheel axle 18, it will be understood that by selectively elongating and/or shortening the control arms 40 on opposite sides of the flywheel 16, the angle of the flywheel axle 18 relative to the centerline of rotation 20 can be selectively altered. That is, by changing the length of the control arms 40, the angles of inclination A1 for the flywheel assemblies 12 can be selectively changed.

Figure 6:
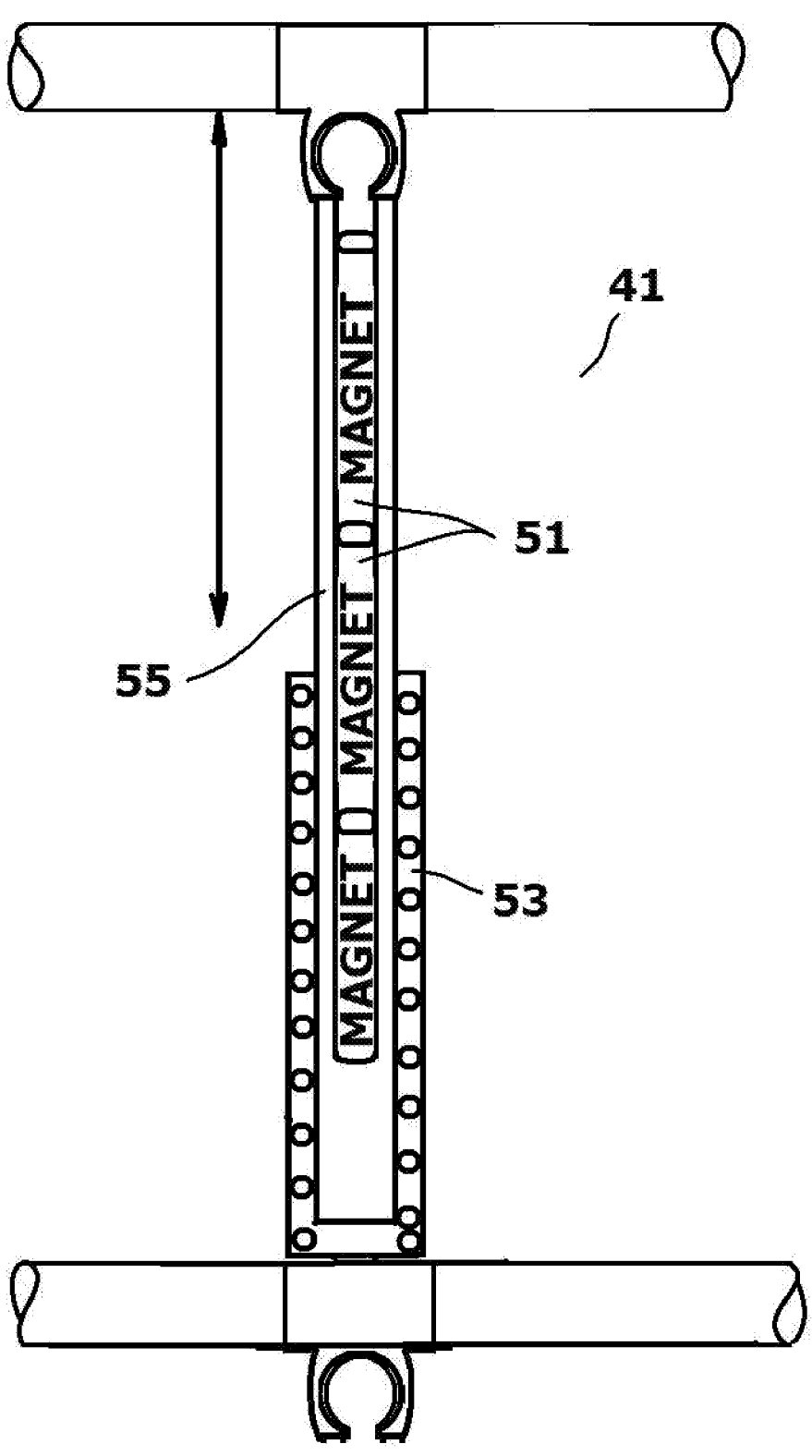
FIG. 6 is an enlarged view of for an alternate control arm configuration that can be substituted for the prior termination shown in FIG. 5.

Referring to FIG. 6 an alternate embodiment for a control arm 41 is shown. In this embodiment, magnets 51 and electromagnets 53 are disposed within a telescoping body 55. By controlling the current provided to the electromagnet 53, the electromagnet 53 can be caused to attract or repel the magnets 51 to a variable degree. This can be used to selectively expand or retract the telescoping body 55. Furthermore, by using magnetism, the overall control arm 41 has some ability to momentarily expand or contract without damage if unexpected forces are encountered. As such, the control arm 41 can absorb energy produced by minor resonances and/or out of balance conditions that may develop in one or more of the spinning components.

Figure 7:
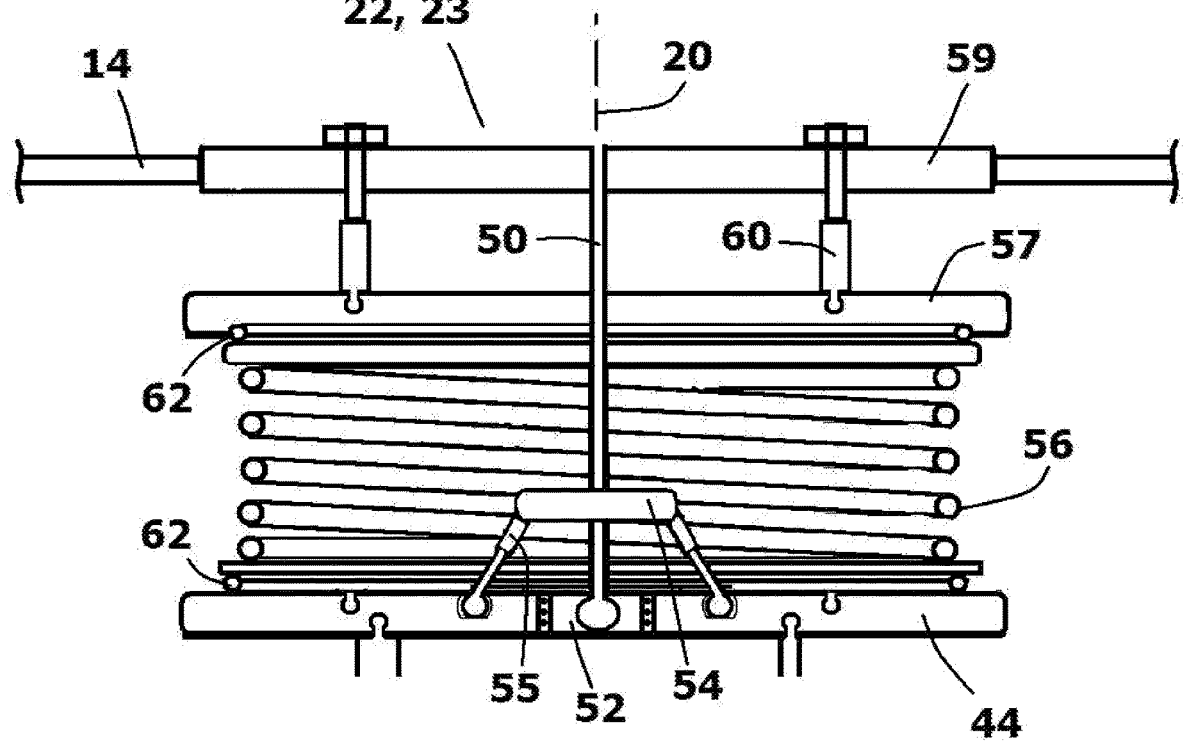
FIG. 7 is an enlarged cross-sectional view of a torque converter used in the exemplary embodiment of FIG. 2.

Referring to FIG. 7 in conjunction with FIG. 2, the details of the torque converters 22, 23 are detailed. The specialized torque converters 22, 23 are preferably identical in structure to provide forces in balance with one another. The two specialized torque converters 22, 23 are utilized in sustaining rotation of the flywheel assemblies 12 within the containment housing 14. The specialized torque converters 22, 23 are positioned on opposite sides of the containment housing 14, wherein both specialized torque converters 22, 23 are aligned on the centerline of rotation 20. For purposes of clarity, reference to the illustrated torque converter applies equally to both specialized torque converters 22, 23, since the two specialized torque converters 22, 23 used by the system 10 are the same.

Each specialized torque converter 22, 23 has a drive platform 44. The drive platform 44 is supported by a drive shaft 50. The drive shaft 50 connects to the center of the drive platform 44 with a socket joint 52 that enables the drive platform 44 to both spin freely and wobble relative to the drive shaft 50. A small platform 54 is connected to the drive shaft 50. Telescoping arms 55 connect the small platform 54 to the drive platform 44. The lengths of the telescoping arms 55 can be selectively controlled. The telescoping arms 55 are initially used in positioning the drive platform 44 along a horizontal plane upon start up but can be set to a floating status or tilting degree in their connection to drive platform 44 upon full operation. The telescoping arms 55 are capable of transmitting rotational force through virtue of their connection to the small platform 54 with its connection to the drive shaft 50. The telescoping arms 55 operate in a similar manner as was previously explained for the longer control arms referenced FIG. 4 and FIG. 5.

A stationary baseplate 59 is mounted to the containment housing 14. An interim plate 57 is connected to baseplate 59 with adjustable arms 60. The length of the adjustable arms 60 can be selectively controlled. A stabilizing element 56 is disposed in between the interim plate 57 and the drive platform 44. In the shown figure, the compression reflective element 56 is a spring. However, other systems, such as opposing magnets can also be used. If a physical compression reflective element 56 is used, such as the illustrated spring, then ball bearing races 62 or other such structures are provided to enable the compression reflective element 56 to rotate relative to the interim plate 57 and the drive platform 44.

Figure 8:
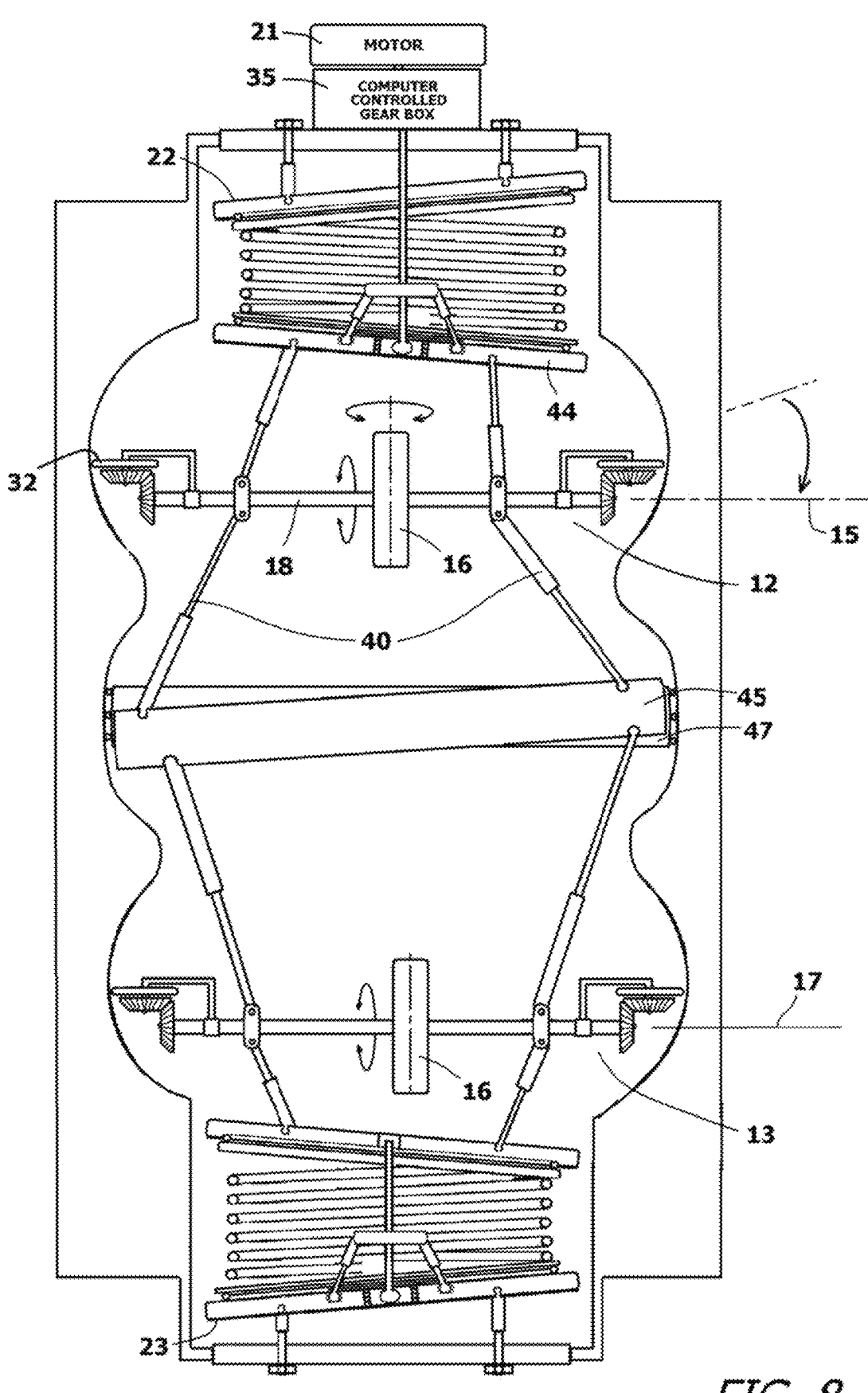
FIG. 8 shows the exemplary system in operation with offset flywheel assemblies creating precessional forces.

Referring to FIG. 8 in conjunction with FIG. 2, FIG. 3, and FIG. 7, it will be understood that to operate the present invention system 10, the flywheel axles 18 are initially set at an angle of inclination relative to the centerline of rotation 20. See FIG. 2. The containment housing 14 is evacuated of air. By activating one or more powered rotational devices 21, the drive shafts 50 in the specialized torque converters 22, 23 cause the rotation of the drive plate 44 by virtue the mutual connection with the platform 54 and its telescoping arms 55. The drive shafts 50 rotate and cause the drive platform 44 of the specialized torque converters 22, 23 to turn.

As the drive platforms 44 spin, the primary control arms 40 also spin. The first set of control arms 40 are connected to the flywheel axles 18 and cause the flywheel axles 18 to spin. As the flywheel axles 18 spin around the centerline of rotation 20, the contact wheels 32 are caused to roll along the concave tracks 36 in the containment housing 14. As the contact wheels 32 roll, they drive the bevel gear assemblies 30, which cause the flywheel axles 18 to turn. The flywheel axles 18 are attached to the flywheels 16. As a consequence, the flywheels 16 are caused to spin. Energy is added to the system until the flywheels 16 are rotating at their operational speeds.

Once the flywheels 16 are rotating at their operational speeds, the first set of control arms 40 are selectively controlled to move the spinning flywheel axles 18 into an orientation that is perpendicular to the centerline of rotation 20. See FIG. 8. Since the flywheels 16 are spinning when reoriented, a precessional force is generated. The precessional forces act to return the flywheels 16 to their original planes of rotation. As such, the precessional forces act upon the first set of control arms 40 that are keeping the axles 18 and the flywheels 16 away from their original orientations. Since the precession forces act upon the first set of control arms 40, the force is transferred to the drive platforms 44 that support the control arms 40. The precessional forces act to move the drive platform 44 out of its original horizontal plane. As a consequence, the drive platforms 44 become inclined as they rotate. The inclination is resisted by the compression reflective elements 56. The resistance force acts to reflect the forces back toward the flywheel assemblies 12, 13. The result is an increase in torque and momentum as the deformations of the precessional forces are countered.

Precession is the change of angular velocity and angular momentum produced by torque. The general equation that relates the torque to the rate of change of angular momentum is a function of angular velocity. Angular velocity of precession is given by Equation 1.

$$p = mgr \ IS \ \mathcal{O}_s = \frac{T}{Is \ \mathcal{O} \ Sin \ \theta} \qquad \text{Equation 1}$$

Where T and L are the torque and angular vectors, respectively.

Is is the moment of inertia.

$\mathcal{O}$ is the angular velocity of spin about the spin axis.

m is the mass.

g is the acceleration of gravity.

θ is the angle between the spin and axis of precession.

r is the distance between the center of mass and the pivot.

The torque vector originates at the center of mass.

using $\mathcal{O} = 2n$ we find the period of precession given by Equation 2.

$$Tp = \frac{4\pi^2 Is}{mgr \ Ts} = \frac{4\pi^2 I sin\theta}{t \ Ts} \qquad \text{Equation 2}$$

Is is the moment of inertia.

Ts is the period of spin about the spin axis.

t is the torque.

The results are specialized torque converters 22, 23 that convert the precessional forces into rotational forces. This in combination with mutual flywheel forced precession acting through the central bearing race 45 enables the overall system 10 therefore remains spinning for extended periods of time after the DC motor 21 is unpowered and converts into a DC generator. The converted precessional force adds significant torque and momentum to the system 10 so that the overall system 10 is difficult to quickly stop spinning. The overall system 10 therefore acts as a store of rotational energy that can be used to run secondary devices, such as the DC motor 21, for a prolonged period of time.

It will be understood that the embodiments of the present invention that are illustrated and described are merely exemplary and that a person skilled in the art can make many variations to those embodiments. All such embodiments are intended to be included within the scope of the present invention as defined by the appended claims.

What is claimed is:

1. A system for storing rotational energy, comprising:
a flywheel axle having opposed ends on an axial centerline;
a flywheel coupled to said flywheel axle at a point between said opposed ends,
contact wheels;
gears that connect said contact wheels to said opposed ends of said flywheel axle, wherein said gears cause said flywheel axle and said flywheel to spin when said contact wheels turn, wherein said flywheel axle, said flywheel, said gears and said contact wheels together form a flywheel assembly;
a containment housing that defines an internal chamber, wherein said flywheel assembly is disposed in said internal chamber and said contact wheels contact said containment housing from within said internal chamber;
wherein said flywheel assembly is rotated within said containment housing about a centerline of rotation causing said contact wheels to roll along said containment housing.

2. The system according to claim 1, wherein said axial centerline of said flywheel axle is initially positioned at an angle of inclination relative to said centerline of rotation, wherein said system further includes control arms that effect said flywheel axle and selectively adjust said angle of inclination.

3. The system according to claim 2, wherein said control arms apply forces to said flywheel assembly that cause said flywheel assembly to spin about said centerline of rotation within said containment housing.

4. The system according to claim 3, wherein said flywheel creates a precessional force when said control arms selectively adjust said angle of inclination of said flywheel axle.

5. The system according to claim 4, wherein said precessional force is transferred through said control arms to a torque converter that increases torque for said flywheel assembly as said flywheel assembly spins around said centerline of rotation in said containment housing.

6. The system according to claim 5, wherein said torque converter includes a drive platform that is connected to said control arms, wherein said drive platform is supported by a drive shaft at a connection that enables said drive platform to incline while spinning.

7. The system according to claim 6, wherein said torque converter includes at least one compression reactive element that resists any inclination in said drive platform.

8. The system according to claim 6, wherein said drive platform has adjustable arms that connect said drive platform to said drive shaft and cause said drive shaft and said drive platform to rotate as a unit.

9. The system according to claim 1, wherein said flywheel assembly is one of a plurality of flywheel assemblies within said containment housing wherein all of said plurality of flywheel assemblies spin around said centerline of rotation.

10. A system for storing rotational energy, comprising:

at least one flywheel assembly having a flywheel mounted on a flywheel axle, wherein said flywheel axle has an axial centerline, and both said flywheel and said flywheel axle spin about said axial centerline;

a containment housing that surrounds said at least one flywheel assembly, wherein said at least one flywheel assembly rotates about a centerline of rotation in said containment housing, wherein said centerline of rotation is offset from said axial centerline by an angle of inclination;

control arms that extend to said at least one flywheel assembly that selectively alter said angle of inclination causing said at least one flywheel assembly to create a precessional force, wherein said control arms apply forces to said at least one flywheel assembly that cause said at least one flywheel assembly to spin about said centerline of rotation within said containment housing;

at least one torque converter that receives said precessional force through said control arms and converts said precessional force into torque that is supplied to said at least one flywheel assembly rotating in said containment housing, wherein said at least one torque converter includes a drive platform that is connected to said control arms, and wherein said drive platform is supported by a drive shaft at a connection that enables said drive platform to incline while spinning.

11. The system according to claim 10, wherein said at least one torque converter includes at least one compression reactive element that resists changes in inclination for said drive platform.

12. The system according to claim 11, wherein said at least one compression reactive element is a spring that rotates with said drive platform.

13. The system according to claim 12, wherein said drive platform has adjustable arms that connect said drive platform to said drive shaft and cause said drive shaft and said drive platform to rotate as a unit.

14. The system according to claim 10, further including tracks on said containment housing that guide said at least one flywheel assembly as said at least one flywheel assembly rotates.

15. A system for storing rotational energy, comprising:

a first flywheel assembly having a first flywheel positioned on a first axle;

a second flywheel assembly having a second flywheel positioned on a second axle;

a containment housing;

a motor for rotating said first axle and said second axle rotate about a centerline of rotation within said containment housing, control arms that connect said first axle to said second axle, wherein at least some of said control arms are selectively adjustable in length and selective incline said first axle and said second axle relative to said centerline of rotation, therein causing said first flywheel assembly and said second flywheel assembly to create precessional forces, and torque converters that receive said precessional force reflect said precessional forces back to said first flywheel assembly and said second flywheel assembly, therein creating a torque force.

16. The system according to claim 15, wherein said motor can be utilized to generate electricity when rotated using said torque force.

17. The system according to claim 15, wherein said torque converters include drive platforms that are connected to said control arms, wherein said drive platforms are supported by a drive shaft at a connection that enables said drive platform to incline while spinning.

18. The system according to claim 17, wherein each of said torque converters includes at least one compression reactive element that resists changes in inclination for said drive platform.

* * * * *